Oct. 11, 1960     J. E. STEEL ET AL     2,956,103
PIPE SUPPORTS
Filed July 8, 1957
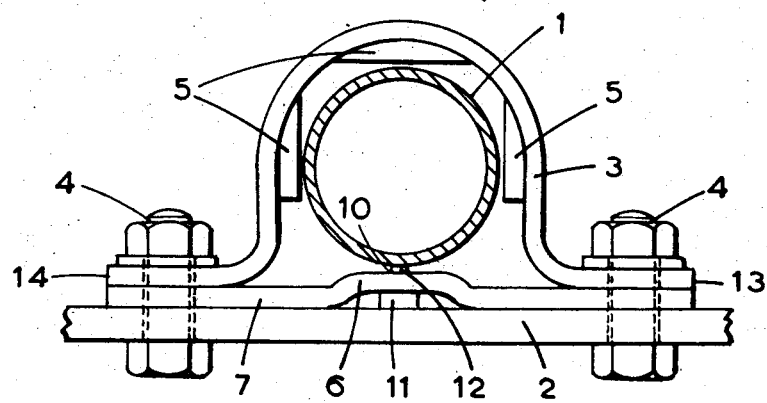
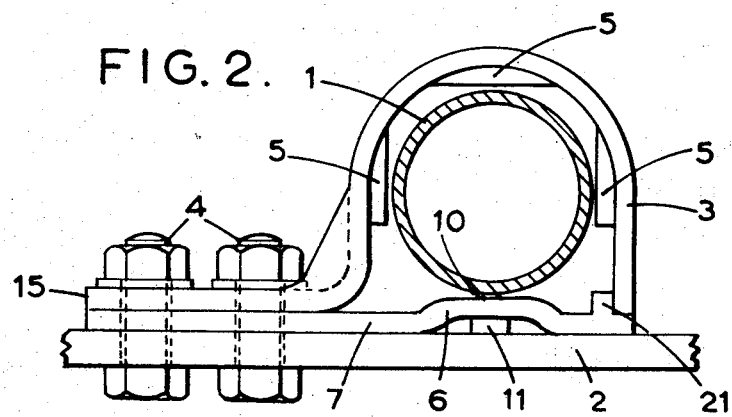
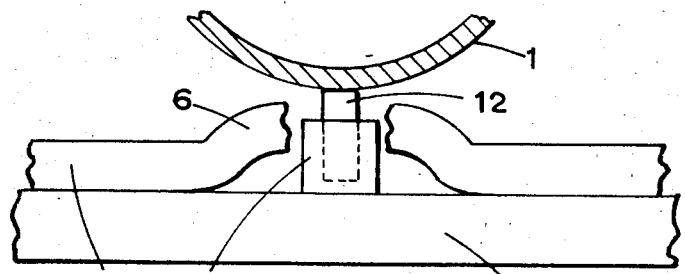
Inventors
John Eric Steel, deceased
by James Steel and William S. Martin, Executors
James Steel
by Shoemaker + Mattare
Attorneys

United States Patent Office 2,956,103
Patented Oct. 11, 1960

2,956,103

PIPE SUPPORTS

John Eric Steel, deceased, late of Sunderland, Durham, England, by James Steel, Wolsingham, Durham, and William Sinclair Martin, Sunderland, Durham, England, executors, and James Steel, Wolsingham, Durham, England, assignors to Steels Engineering Installations Limited, Sunderland, England, a corporation of Great Britain Filed July 8, 1957, Ser. No. 670,507

3 Claims. (Cl. 174—40)

This invention relates to supporting means for pipes and more especially to pipe insulating supports suitable for carrying aluminium alloy pipes in steam heating and like installations such as those used for the heating of oil in fuel or cargo tanks in ships and tankers and in storage tanks on land.

The present invention provides improved pipe supports that are simple and cheap to manufacture and install and which will afford effective insulation of the aluminium pipe from the surrounding structure usually of steel and thus prevent deleterious electro-chemical action, the straps of the supports being bent up from flat metallic bar stock.

An insulating pipe support especially for light alloy pipes in heating installations according to the present invention, consists of a strap formed from moulded plastic or synthetic resinous material having a fibre glass reinforcement wherein said acts in conjunction with a base plate of similar material to support the pipe, including a leakoff device controlling the build up of electrical potential between the light alloy and any ferrous part of the installation.

According to one aspect of the present invention the straps are formed from moulded plastic or synthetic resinous material having a fibre-glass reinforcement, and which is itself insulating and resistant to sea water and petroleum products while retaining its strength and other mechanical properties when in contact with steam pipes at the maximum temperatures normal to the types of installation for which the brackets are intended, say temperatures up to 350° F.

In one embodiment of the improved pipe support the fibre glass reinforced strap, which is shaped to encircle or partially encircle the pipe, is formed with a plurality of, say three, raised portions or projections, which engage the pipe for its location, and a similar projection is provided on a fibre-glass reinforced plastic base-plate. These four raised portions hold the pipe accurately as required, but limit the rubbing surface as between the pipe and the clip, facilitating movement due to expansion and contraction, and ensuring that the pipe will not bind in the clip if there is any misalignment or movement.

In order to avoid electrolytic action between a non-ferrous pipe such as an aluminium alloy and the steel structure of the ship, it is necessary to have an adequate degree of electrical insulation for example provided by the plastic fibre-glass reinforced clip or strap and the base-plate. At the same time, in certain circumstances there could be a build-up of static electricity in the insulated material, in this case the aluminium alloy pipe due for example to its being subjected to a high pressure jet of steam or to the condensing droplets from such a jet. In such a case it is possible that in conditions of perfect insulation and with no surface leak-off over the insulating bracket, static electricity could build up to such a potential that it would ultimately jump the gap between the insulated material and the ship's structure, and that such a spark could be dangerous. Accordingly, it is felt that there should be provided in each insulating bracket a controlled leak-off. It therefore becomes necessary to strike a controlled happy mean between adequate insulation to prevent electrolytic corrosion at the low cell potential and to limit this insulation so as to preclude any possibility of the build-up of a high voltage potential of static electricity.

Consequently it is proposed according to the present invention that the base-plate of the clip shall be so constructed that the raised portion shall have a tapered hole through it and that in the recess below the raised portion there shall be fitted a plug of conductive material with a metal insert, the insert protruding through the tapered hole and making contact with the pipe. This insert will be suitably in the form of a non-ferrous rod or tube encased at the base in a plug of conductive material bonded with synthetic resin, this plug having conductive properties but which is resistant to sea water and petroleum products and which, due to its composition, will have an electrical resistance not in excess of one megohm. In practice this will be made so that it is a close fit to the steel supporting structure of the bracket and so that when the base plate is bolted down the conductive plug will be in direct contact with the steel supports and the non-ferrous rod or tube will be in direct contact with the pipe, and so will maintain positive contact through the tapered hole in the base plate with the pipe and steel supporting structure.

Alternatively this insert will suitably be in the form of a synthetic rubber plug having conductive properties which is resistant to sea water and petroleum products, and which due to its composition will have an electrical resistance not in excess of one megohm. In practice this will be made so that it is not quite a close fit in the depth of the bracket, and so that when the base-plate is bolted down the "plug" will be under compression, and so will maintain positive contact through the tapered hole in the base-plate with the pipe.

Alternatively again this may be in any other form which provides electrical connection between the non-ferrous pipes and the ferrous material of the tank, which incorporates a resistance sufficient to prevent electrolytic corrosion but insufficient to allow the build-up of static electricity to a dangerous potential.

The improved design of pipe clips therefore provide systems in which an accurate degree of insulation is maintained within predetermined limits by a plug of conductive material with a non-ferrous rod or tube or a synthetic rubber plug having conductive properties or by any means as described above. The whole device is itself resistant to sea water and petroleum products, and it can be conveniently located and so disposed as permanently and effectively to maintain contact with the pipe and it can by its composition form a leak-off of determined capacity. In this way the level of the insulation is sufficient to ensure that there is no electrolytic corrosion and at the same time the insulation is not so perfect as to permit the build-up of static to a dangerous potential.

It is another aspect of this invention that by reason of the natural buoyancy of the non-ferrous pipes in steam heating and like installations when immersed in oil or other liquids, the pipes may lift from the conductive device, but be still maintained in position of alignment by the encircling fibre glass reinforced strap, the amount of movement allowable being controlled by a required tolerance on the encircling strap, and when the oil or other liquid is removed the non-ferrous pipes will again come to rest upon the controlled leak-off device.

The fibre-glass strap is substantially, U-shaped, except for the inwardly projecting raised portions or protuberances engaging the pipe, and the base-plate also may be similar, but has a central raised portion perforated to mount the conducting plug.

Alternatively, a single tailed version may be employed with two clamping screws securing the tail of the clip to a flat bar support and with the base-plate having a shaped seat for the other end of the plastic clip.

In order that the invention may be further understood two embodiments will be described with reference to the accompanying drawings, in which Figure 1 represents an elevation of a twin tailed pipe supporting strap, Figure 2 represents an elevation of the single tailed version and Figure 3 represents an enlarged cut-away view of a base plate and plug according to the invention.

In the drawings 1 generally designates a pipe, while 2 designates a bracket attached to the tank, ship or the like. 3 designates a strap formed from moulded plastic and synthetic resinous material having a fibre glass reinforcement and being shaped to partially encircle the pipe 1. It is formed with three raised portions or projections 5, which engage the pipe for its location, and a similar projection 6 is provided on a fibre glass reinforced base plate 7.

Encircling strap 3 has two flanges 13 and 14 in Figure 1 and one flange in Figure 2 at 15. The flanges are bolted to bracket 2 by bolts 4.

The raised portion 6 of base plate 7 is apertured at 10 to locate plug 11 with an insert 12 which latter is depicted in detail in Figure 3.

What we claim is:

1. An insulating pipe support for pipes in heating installations comprising a base member formed of electric insulating material and having an upwardly facing projection formed integral therewith, a strap member including a U-shaped portion facing said base member, said strap being connected to said base member and having formed integrally therewith a plurality of projections extending inwardly toward the center of the U-shaped recess defined thereby, a pipe supported within said strap and base member and loosely fitted with respect to said projections, and a leak-off device supported closely adjacent said base member including an insert and a plug, said plug being formed of electrically conductive material and adapted to be connected to an electrically conductive support member, said insert being supported by said plug and comprising a non-ferrous material, said insert being in frictional contact with the outer surface of said pipe and having a resistance sufficient to prevent electrolytic corrosion but insufficient to allow the build-up of static electricity to a dangerous potential.

2. Apparatus as defined in claim 1 wherein the plug member has a resistance not in excess of one megohm.

3. An insulating pipe support for use in heating installations comprising a strap formed of electrically non-conductive material, said strap having an arcuate configuration, a base plate of electrically non-conductive material connected with said strap for defining an enclosed opening for receiving a pipe, a pipe mounted within the pipe support and extending through said opening, said pipe having a plurality of inwardly projecting portions for properly positioning a pipe within said opening, said base plate also having an inwardly projecting portion for properly positioning a pipe within said opening, the projections on said strap and said base plate defining an enclosed opening of slightly greater size than the outer dimension of the supported pipe for permitting expansion and contraction of the pipe and to allow the pipe to lift away from the base plate, said pipe support including an electrically conductive member mounted within said opening and supported adjacent said base plate for engaging a pipe supported therein, said member having a predetermined electrical resistance to prevent electrolytic corrosion but insufficient to allow build-up of static electricity to a dangerous potential.

References Cited in the file of this patent

UNITED STATES PATENTS

| | | |
|---|---|---|
| 622,739 | Wahlert | Apr. 11, 1899 |
| 677,765 | Hoerr | July 2, 1901 |
| 2,215,283 | Adler | Sept. 17, 1940 |
| 2,338,009 | Peters | Dec. 28, 1943 |
| 2,395,926 | Webb | Mar. 5, 1946 |
| 2,427,883 | Score | Sept. 23, 1947 |
| 2,706,744 | Rudd | Apr. 19, 1955 |

FOREIGN PATENTS

| | | |
|---|---|---|
| 839,585 | Germany | May 23, 1952 |
| 907,141 | Germany | Mar. 22, 1954 |

OTHER REFERENCES

Fiberglass (publication) Catalog EL 44-7, 1944, page 21.

Electronic Design (publication), March 1, 1957, page 128.

Transactions, I.R.E. (Rubber Chemistry Technology), publication, June 3, 1941; pages 50 and 51 relied on.